Feb. 24, 1931. P. B. HUYETTE 1,794,295
ADAPTER FOR WATER GAUGES
Filed June 29, 1928
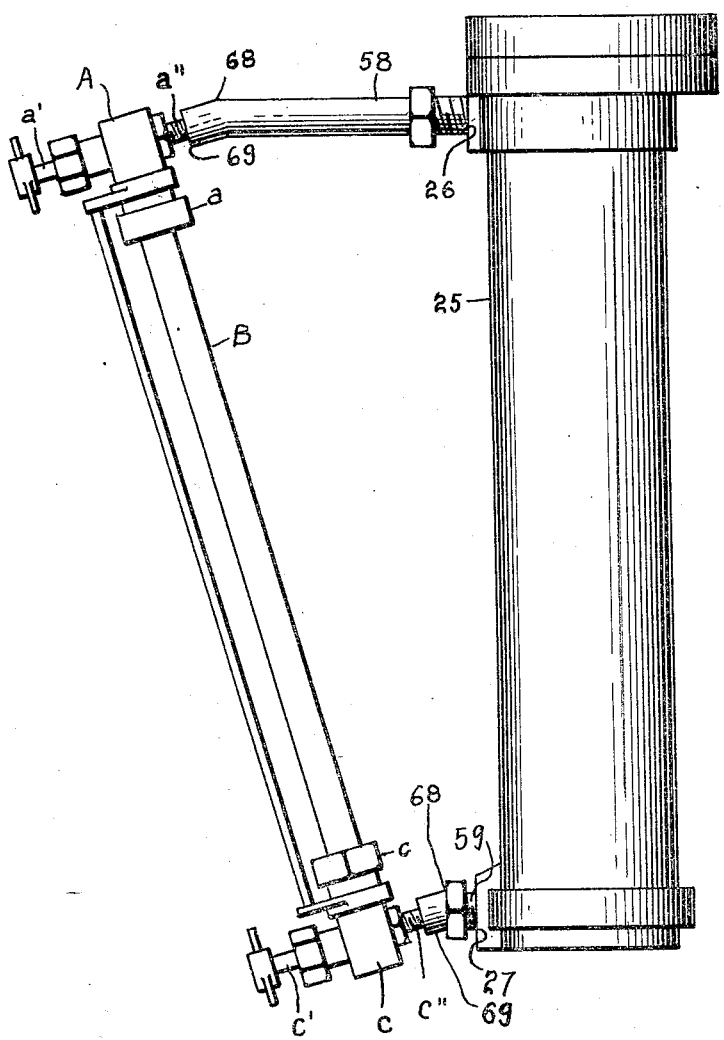
INVENTOR:
PAUL B. HUYETTE,
BY Frank H. Borden
ATTORNEY.

Patented Feb. 24, 1931

1,794,295

UNITED STATES PATENT OFFICE

PAUL B. HUYETTE, OF PHILADELPHIA, PENNSYLVANIA, ASSIGNOR TO PAUL B. HUYETTE CO., INC., OF PHILADELPHIA, PENNSYLVANIA, A CORPORATION OF NEW JERSEY

ADAPTER FOR WATER GAUGES

Application filed June 29, 1928. Serial No. 289,180.

My invention relates to adapters for water gauges, pertaining particularly to fittings adapting normally vertical water gauges for angular positioning on boilers and water columns for increased visibility of the water level therein.

The subject matter of this application was originally disclosed and claimed in application #88,485, filed Feb. 15, 1926, which eventuated in Patent #1,615,204.

As boilers have become larger and higher it has become increasingly difficult to read the water level in the water gauges located at a considerable distance from the floor and it has been found advantageous to incline the gauges at an angle to the perpendicular so as to facilitate observations of the water level.

Although it is not broadly new to achieve this effect, applicant being well aware of the activities of inventors along this line, yet so far as known in every case it requires special fittings adapted to maintain the gauge in one position only, or else a modification of the water column structure with which the gauge is associated.

It is customary for dealers to maintain a stock of standard water gauges adapted normally and solely for vertical attachment to boilers and water columns, as there is a rather constant demand for such vertically attached gauges. To provide in the case of high boilers gauges normally and solely adapted for angular positioning would necessitate a duplication of stock and the tying up of capital that would be disadvantageous. Further it is desirable to utilize as many old fittings as may be expedient when making changes or additions to the batteries of boilers in a plant, and hitherto it has been impossible to use old vertical water gauges on new and high boilers with any success, due to the sharp angle formed by the line of sight from below, and the vertical gauge glass.

It is an object of my invention to provide means for affixing a normally vertical water gauge to a receptacle at an angle to the perpendicular.

It is a further object of my invention to provide secondary fitting or fittings adapted for operatively mounting a normally vertical water gauge in the vertically aligned openings in a boiler or other receptacle, but with the water gauge at an angle to the perpendicular.

It is a further object of my invention to provide a water gauge with fittings adapted for application as a unit to the vertically aligned but spaced openings normally provided in a receptacle, whereby the gauge glass is maintained in a position of angularity relative the perpendicular.

Many additional objects and advantages will be apparent upon perusal of the description in connection with the appended drawings.

Although my invention is subject to many modifications and variations, according to conditions, I provide in a preferred form, in connection with a boiler or other receptacle having spaced but vertically aligned openings, and with a normally vertically mounted water gauge, a tubular connection interposed between at least one such opening and an end of the water gauge whereby the gauge is held in an inclined position relative the vertical or perpendicular.

In the accompanying drawings the figure represents a side elevation of a normally vertically mounted water gauge operatively engaged with the openings in a receptacle by adapters so disposed as to effect positioning of the water gauge at an angle to the vertical.

For illustrative purposes the invention will be shown as being applied to a standard water column 25, although obviously applicable to any other sort of receptacle, whether boiler, tank, vat, etc., and the term "receptacle" is intended to cover any such as might require a level indicating device.

The receptacle 25 is provided customarily with upper and lower substantially vertically aligned openings 26 and 27, which openings are usually threaded but may be provided with studs or plates to which flanges of a flanged water gauge may be attached. It will be observed that in the normal course with a standard water gauge the water gauge will be held in operative communication with the openings in a vertical position, substantially parallel with the face of the receptacle.

There are many situations in which such a sharp angle is formed between the gauge glass and the line of sight of an observer looking up from below that accurate reading of the level of the liquid in the receptacle is impossible. This is an incident of the use of high boilers, as noted, and it is therefore very desirable that the gauge be held at an angle to the vertical for a better sight of the fluid level.

The water gauge, or liquid level indicator, in the conventional and standardized form with which this invention treats comprises an upper valvular fitting A, gauge glass B, and a lower valvular fitting C. The fittings have each a glass receiving gland, respectively $a$ and $c$, perpendicular to the axial extent of the valve stems $a'$ and $c'$, and each terminates in an integral rigid connecting shank $a''$ and $c''$, extending perpendicularly to the gauge glass B, and adapted to be received by the receptacle in operative communication with the respective openings 26 and 27. In the drawing the shanks $a''$ and $c''$ are shown as threaded for insertion into threaded openings 26 and 27, yet the provision of flanges on the shanks for effecting the connection is contemplated.

The adapter of this invention comprises straight tubular conduits of different lengths arranged horizontally and perpendicularly to the face of the receptacle in operative communication with the respective openings in the receptacle, with which the shanks of the standard water gauge communicate toward their outer ends the axes of which are angularly divergent from the axes of the horizontal portions of the tubular conduits. In the form shown the upper conduit 58 is the longer, and the lower conduit 59, is the shorter, and each is provided at one end with a threaded shank, or other connection, adapted or arranged for axial engagement in operative communication with the respective openings in the receptacle, so that the major portion of the upper adapter at least, and a portion of the lower adapter lie in substantially horizontal planes projecting from the face of the receptacle. In the illustrative disclosure the adapters have each an angular curve or bend 68, adjacent a divergent ported connection or extension 69, formed integrally (preferably) with which the perpendicular extension of the appropriate gauge fitting may be engaged in a rigid and inflexible connection. Although the ported connection is illustrated as being provided at the very end of the adapter it will be obvious that this is not essential as it may be disposed toward the end, so long as the axis of the perpendicular shank of a gauge fitting is rigidly held and maintained as a line divergent angularly from the axis of the horizontal portion of the adapter. It will be noted that the assembly of a standard water gauge with the standard receptacle as described, through the rigid incorporation of the different lengths of adapters maintains a rigid standard water gauge assembly, always capable of disassembly from the adapters and use as a vertical water gauge, and thoroughly practical to withstand the tremendous pressures to which it is susceptible.

In considering the gauge with which the adapter is associated, the standard, that is the gauge that would be carried in stock for vertical attachment is the type to which this description pertains, the essential part of which is a rigid integral perpendicular connecting shank extending from the fittings, and which may or may not be provided with valves, (although valves are preferred). It is this type only that will sustain the pressures of modern practice.

By having the adapters extend horizontally, then provide divergent ported extensions or connections at different distances from the face of the receptacle the angular positioning of a standard water gauge is an easy and simple matter.

The advantages of my invention are thought to be obvious. Although of the utmost simplicity and ease in application, yet it fills a long felt want, and will be the means of saving large sums in utilization of vertically used gauges, in an angular position on receptacles. It will be obvious that many modifications of the invention will occur to those skilled in the art, and such are to be construed within the invention as defined in the appended claims. In connection with which I wish to make it known that I am well aware of the inventions disclosed in the following and other patents: Blevney 688,287, Lank 1,307,982; Ernst 1,448,920, and 1,511,325.

I claim as my invention:

1. The combination with a normally vertical water gauge, of a pair of adapters for supporting the gauge at an angle to the vertical, each adapter comprising a tubular conduit adapted for axial and lateral engagement with the openings of a receptacle, and terminating in an angular connection in which the fittings of the water gauge may be connected, the angularity of the connection being such that the connection will be at right angles to the gauge, and being of different lengths whereby the associated water gauge is maintained in a position of angularity relative to the vertical.

2. The combination with a water gauge including integral perpendicular extensions arranged for connection to vertically spaced parallel openings in a receptacle to support the gauge in a vertical position on the receptacle, a pair of adapters having horizontal portions of different lengths arranged respectively for attachment to such receptacle in communication with the openings, each adapter having an outer end providing a ported connection divergent from the bore of the horizontal portion, and means for operatively mounting the extensions of the water gauge fittings in rigid engagement with the ported connections, the divergence of the ported connections being such that the connection will be at right angles to the gauge although the normally vertically mounted water gauge is supported at an angle with the vertical.

3. In combination, a pair of adapters, a standard water gauge, and a receptacle having vertically spaced parallel openings, each adapter comprising a conduit having one end provided with means for attaching the conduit to a receptacle in operative communication with a respective opening in such receptacle whereby the conduits extend perpendicularly from the receptacle in horizontal parallel spaced relation, each conduit having a bend or curve and terminating in a ported connection angularly divergent from the horizontal portion, means for operatively connecting the water gauge to the ported connections whereby such water gauge is operatively in communication with the receptacle, the portions of the conduits between the bend and the connection to the receptacle being of different lengths whereby the water gauge is outwardly inclined relative to such receptacle.

4. The combination of a receptacle having vertically aligned openings, a standard water gauge having perpendicular rigid extensions, a pair of horizontally disposed conduits of different lengths each rigidly engaged with the receptacle in communication with one of the openings therein and with the respective rigid extensions of the water gauge to operatively associate the water gauge and the receptacle, the axis of each rigid extension being angularly divergent from the axis of the associated horizontal conduit, the whole effecting a rigid operative support of the water gauge on the receptacle at an angle to the vertical.

5. The combination with a water gauge, having fitting extensions permanently at right angles to the axis of the gauge glass, of a receptacle having vertically spaced parallel openings, conduits of different lengths and each respectively providing a pair of ports, the ports of each conduit being axially divergent from each other and the ports of one conduit being further spaced apart than the ports of the other conduit, said conduits engaging the respective extensions and the respective openings of the receptacle whereby the respective ports communicate respectively with the water gauge and the receptacle for operatively associating the water gauge and said receptacle at an angle with the vertical while still maintaining a right angle disposition of the extensions of said fitting.

6. The combination with a water gauge, comprised of upper and lower fittings and a gauge glass, the fittings of which include substantially identical integral extensions having axes and disposed perpendicular to the glass whereby the gauge may be operatively and vertically associated with a receptacle having vertically spaced parallel openings, of a receptacle having vertically spaced parallel openings, of an adapter having one end portion having an axis, said end portion of the adapter arranged for substantially horizontal operative association with the receptacle in communication with one opening therein and with its axis substantially perpendicular to the receptacle, said adapter having a connecting portion, the axis of the connecting portion being angularly divergent from the axis of said end portion, one of the perpendicular extensions joined to the connection with its axis coincident with the axis of said connecting portion, whereby one end of the water gauge is maintained in operative communication with the receptacle in horizontally spaced relation thereto, means for operatively associating the other extension in communication with the other opening in said receptacle but in relatively closer horizontally spaced relation, whereby the water gauge is held operatively on the receptacle at an angle to the vertical.

7. The combination with a water gauge, and a receptacle having vertically spaced openings, said water gauge including extensions substantially perpendicular to the axis of the gauge glass and maintained in rigid spaced relation a distance equal to the distance between the openings in the receptacle, adapter elements having ports and including substantially straight substantially horizontal portions and respectively operatively associated with the respective extensions by means of the ports and with the respective openings, the horizontal portions being in substantial parallelism but being of different lengths whereby the effective lengths of the respective adapters is different so that the water gauge is supported with its axis angularly inclined from the vertical.

In testimony whereof, I affix my signature.

PAUL B. HUYETTE.